US006997387B1

(12) United States Patent
Hepworth et al.

(10) Patent No.: US 6,997,387 B1
(45) Date of Patent: Feb. 14, 2006

(54) APPARATUS AND METHOD FOR CALIBRATION OF PROJECTED TARGET POINT WITHIN AN IMAGE

(75) Inventors: Paul J. Hepworth, Riverton, UT (US); Mario Miyojim, West Valley, UT (US); Morgan Taylor, Lehi, UT (US)

(73) Assignee: The Code Corporation, Draper, UT (US)

( * ) Notice: Subject to any disclaimer, the term of this patent is extended or adjusted under 35 U.S.C. 154(b) by 411 days.

(21) Appl. No.: 10/109,081

(22) Filed: Mar. 28, 2002

Related U.S. Application Data

(60) Provisional application No. 60/279,365, filed on Mar. 28, 2001.

(51) Int. Cl.
*G06K 5/04* (2006.01)

(52) U.S. Cl. .......................... 235/462.08; 235/462.01; 235/375; 235/435; 235/454

(58) Field of Classification Search ................ 382/291, 382/181, 103, 209, 217, 218, 184; 235/462.08, 235/462.01, 375, 435
See application file for complete search history.

(56) References Cited

U.S. PATENT DOCUMENTS

| | | | | | |
|---|---|---|---|---|---|
| 5,550,362 | A | * | 8/1996 | Sherman | 235/455 |
| 5,621,217 | A | * | 4/1997 | Seachman et al. | 250/559.1 |
| 5,663,806 | A | * | 9/1997 | Grise et al. | 358/406 |
| 5,832,106 | A | * | 11/1998 | Kim | 382/154 |
| 6,122,410 | A | * | 9/2000 | Zheng et al. | 382/291 |
| 6,137,893 | A | * | 10/2000 | Michael et al. | 382/103 |
| 6,188,801 | B1 | | 2/2001 | Tsai et al. | 382/294 |
| 6,195,455 | B1 | * | 2/2001 | Mack et al. | 382/154 |
| 6,263,117 | B1 | | 7/2001 | Lee | 382/254 |
| 6,288,801 | B1 | * | 9/2001 | Leberl et al. | 358/474 |
| 6,377,700 | B1 | * | 4/2002 | Mack et al. | 382/154 |
| 6,384,920 | B1 | * | 5/2002 | Goltsos | 356/601 |
| 6,594,600 | B1 | * | 7/2003 | Arnoul et al. | 702/94 |
| 6,724,930 | B1 | * | 4/2004 | Kosaka et al. | 382/154 |
| 2002/0006217 | A1 | * | 1/2002 | Rubbert et al. | 382/131 |
| 2002/0134839 | A1 | * | 9/2002 | Iwaki | 235/454 |
| 2003/0038933 | A1 | * | 2/2003 | Shirley et al. | 356/243.1 |
| 2003/0076498 | A1 | * | 4/2003 | Pfister | 356/402 |
| 2003/0103651 | A1 | * | 6/2003 | Novak | 382/106 |
| 2003/0185420 | A1 | * | 10/2003 | Sefcik et al. | 382/103 |
| 2003/0235330 | A1 | * | 12/2003 | Tanaka | 382/151 |
| 2004/0104338 | A1 | * | 6/2004 | Bennett et al. | 250/234 |
| 2004/0169900 | A1 | * | 9/2004 | Chase et al. | 358/504 |
| 2004/0170315 | A1 | * | 9/2004 | Kosaka et al. | 382/154 |
| 2004/0175052 | A1 | * | 9/2004 | Bian et al. | 382/254 |
| 2004/0208373 | A1 | * | 10/2004 | Aoki et al. | 382/191 |
| 2004/0212856 | A1 | * | 10/2004 | Zhang | 358/504 |

\* cited by examiner

*Primary Examiner*—Karl D. Frech
*Assistant Examiner*—Daniel Walsh
(74) *Attorney, Agent, or Firm*—Madson & Metcalf

(57) ABSTRACT

The present invention provides a novel optical reader device and method for calibrating the device. The device executes a calibration module that locates the actual coordinates for a targeting symbol in a captured image. The coordinates are stored as calibration coordinates in the memory. During normal operation of the reader device, the stored calibration coordinates are used to locate a target, such as a bar code. In order to locate the targeting symbol, the calibration module may overlay a template on clusters that may be the targeting symbol. A reasonable accurate comparison identifies the cluster as the targeting symbol. Alternatively, the calibration module may approach a cluster from four frames of the image and identify the cluster's tangents and perimeter. Geometrical calculations are used to identify the center of an identified targeting symbol.

62 Claims, 9 Drawing Sheets

500 locate center of ring
502 count number of pixels in the image matching corresponding positions in a template and count number of background pixels inside the inner ring
504 locate coarse approximation of ring center
506 refine location of ring center
508 locate center of center dot
510 count number of matching pixels inside center point and number of background pixels outside
512 locate coarse approximation of center dot
514 refine location of center
516

Figure 5

APPARATUS AND METHOD FOR CALIBRATION OF PROJECTED TARGET POINT WITHIN AN IMAGE

RELATED APPLICATIONS

This application is related to and claims priority from U.S. patent application Ser. No. 60/279,365 filed Mar. 28, 2001, for "Calibration of Projected Target Point within an Image," with inventors Paul J. Hepworth, Mario Miyojim, and Morgan Taylor, which is incorporated herein by reference.

BACKGROUND OF THE INVENTION

1. Field of the Invention

The present invention relates generally to the field of optical reading devices. More specifically, the present invention relates to the calibration of projected target points in images captured by a miniature camera into an optical reading device just after assembly or during normal use.

2. Description of Related Background Art

Computer technology has made large amounts of information readily available. Electronic information sources may be found on storage media or storage devices such as hard drives, CD-ROMs, DVD-ROMs, etc., on a local computer, on a local computer network or a global computer network, such as the Internet. Electronic information may also be stored in bar codes, such as one or two dimensional bar codes.

Bar codes are placed on components, equipment, inventory items, packaging, and within printed documents. A bar code is scanned by an optical reader device to retrieve information associated with the bar code. The information may relate to an associated item, document, or reference. Bar codes may also enable access to commonly used web sites, email addresses, and even program applications or data files. Bar codes may be created by various applications that allows for convenient use by professionals, office users, and home consumers. Bar codes and optical reader devices provide useful methods for how information is captured, processed, and transmitted. Image based scanning by relatively low-cost optical devices is used in a wide range of data networking and data management services.

Optical reader devices may be manufactured relatively inexpensively and are adaptable to a variety of different environments. To ensure quality and performance, optical reader devices are assembled under tight tolerances. A user tests the alignment of an optical reader device by projecting a targeting symbol onto a specified bar code that is located adjacent several bar codes on a printed plane. The user then activates the reading of the specified bar code by the optical reader device. The user verifies whether the specified bar code at which the optical reader device is aimed is the code actually read. If the outcome is negative, then the optical reader device is mechanically readjusted until the outcome is positive.

If sufficient tolerance of the optical reader device can be maintained, then testing may be avoided. However, such tolerance is not always assured and mechanical readjustment is a time consuming and tedious process. Thus, it would be beneficial to provide an optical reader device that eliminated the need for mechanical readjustment. Such a device is disclosed and claimed herein.

BRIEF DESCRIPTION OF THE DRAWINGS

Non-exhaustive embodiments of the invention are described with reference to the figures, in which:

FIG. 5 is a flow diagram illustrating an embodiment of the comparison process as it may be applied to a bull's eye targeting symbol;

DETAILED DESCRIPTION

The present invention provides a novel optical reader device and method for calibrating the device. The optical reader device includes a light projector for projecting a visible targeting symbol onto a plane surface. The reader device further includes a camera to capture an image of the surface. In operation, the reader device is place in a rig or bracket that places the projector and camera at an adequate distance from the plane surface. A user then activates the projection of the targeting symbol and image capture.

The reader device further includes a processor that is in electrical communication with a memory. The memory contains a calibration module that includes an algorithm for performing methods of the present invention. The calibration module is executed to locate the actual coordinates for the targeting symbol in the captured image. The coordinates are stored as calibration coordinates in the memory. During normal operation of the reader device, the stored calibration coordinates are used to locate a targeted bar code among other codes within a captured image.

In order to locate the targeting symbol in the captured image, the calibration module combines image processing, pattern recognition, and general computing techniques (thresholding, template matching, geometry, and searching) in a unique way. One of skill in the art will appreciate that these techniques may be used with reader devices having different projectors, cameras, illumination assemblies, and targeting symbol shapes and sizes and still be within the scope of the invention. The steps performed by the calibration module and discussed herein are illustrative of the invention and are not meant to limit the invention.

Figure 1:
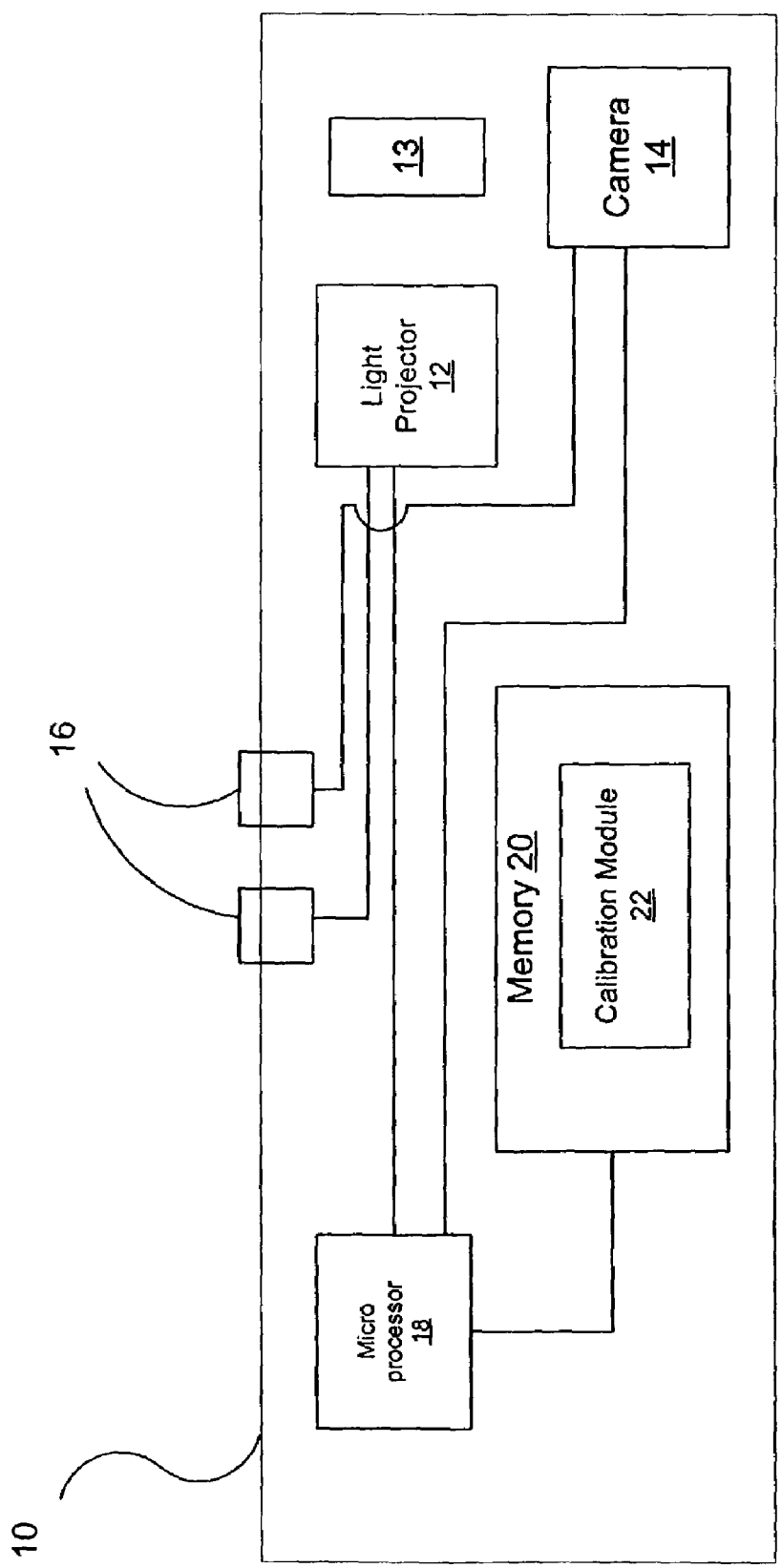
FIG. 1 is a block diagram of an optical reader device suitable for use with the present invention.

Referring to FIG. 1, a block diagram illustrative of a portable optical reader device 10 suitable for use with the present invention is shown. The optical reader device 10 is used for selecting and reading machine-readable graphical codes, such as one and two dimensional bar codes. One of skill in the art will appreciate that the device 10 may be embodied in a variety of forms and be configured with different shapes and sizes. Thus, the device 10 is for illustrative purposes only and is not limiting of the scope of the invention.

The device 10 includes a light projector 12 for generating and transmitting a beam of light, such as a laser, to a planar surface. The light projector 12 is configured to provide a targeting symbol onto the planar surface. A focusing optic 13 may be disposed adjacent the projector 13 to focus the light as needed.

In addition to projecting a targeting symbol, the light projector 12 may also include a light source (not shown) that provides illuminates a surface. The illumination may be full-field to increase lighting on a surface. Alternatively, the light source may be separately disposed from the projector 12. The light source may be operated independently from the projector 12 to illuminate the surface as desired by a user.

The device 10 further includes a camera 14 that captures an image of the surface. The light projector 12 and the camera 14 are in electrical communication with manually operated controls 16 to enable user operation.

The device 10 further includes a processor 18, microcontroller, or other digital processing device that is in electrical communication with the projector 12, camera 14, and a memory 20. The memory 20 collectively refers to one or more memory components such as ROM, RAM, non-volatile memory, and Flash memory that may be used in the present invention. The processor 18 performs instructions received from the memory 20 in accordance with the invention. The memory 20 includes a calibration module 22 that is an application that finds the current location of a targeting symbol within a given image to thereby calibrate the target point.

In operation, the device 10 selects a machine-readable graphical code that is closest to the targeting symbol. The targeting symbol, as determined by the calibration module 22, is used by the processor 18 to select the nearest code. Software that is used for locating, decoding, and returning the location of machine-readable graphical code is well known in the art.

Figure 2:
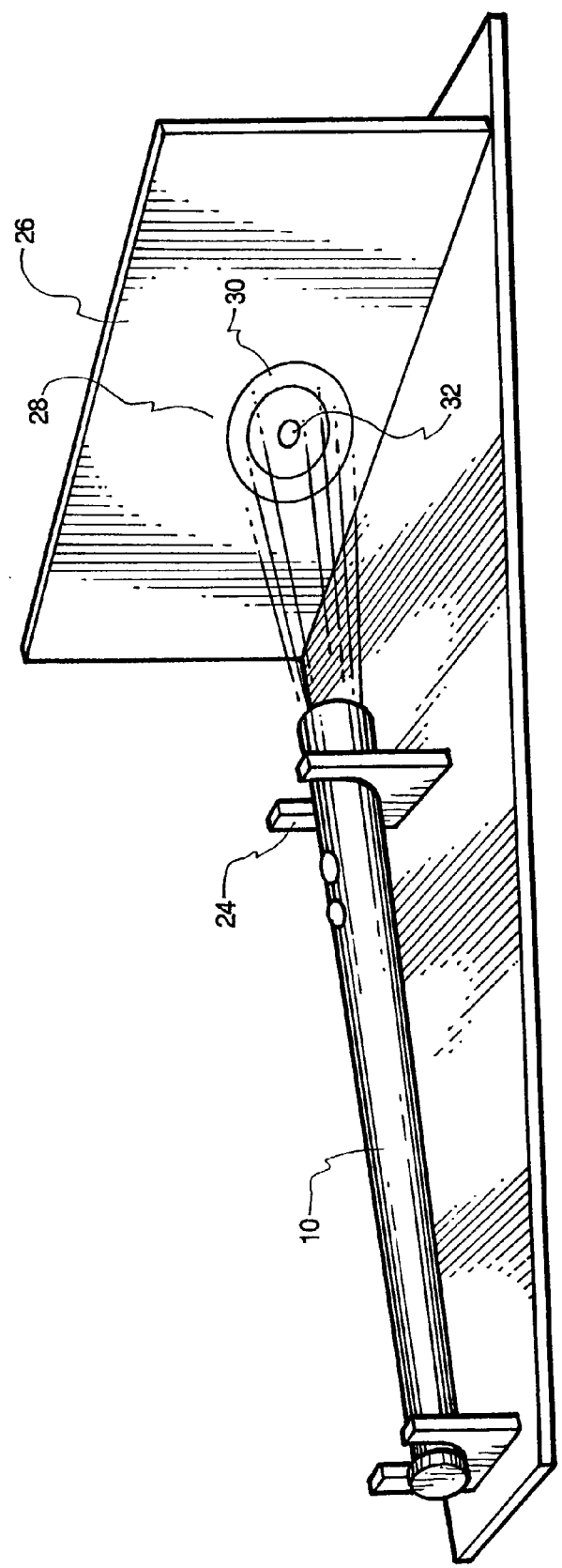
FIG. 2 is a perspective view of an optical reader device projecting a targeting symbol onto a planar surface.

Referring to FIG. 2, the device 10 is shown disposed within a rig 24 to place the device 10 at a certain distance from a planar surface 26. The light projector 12 projects the targeting symbol 28 onto the planar surface 26. The targeting symbol 28 may be embodied in numerous configurations including, as shown in FIG. 2, a ring 30 with a center dot 32, also referred to as a bull's eye. Alternatively, the targeting symbol 28 may be embodied as cross hairs, a single circle, and the like.

The camera 14 receives and captures an image of the planar surface 26 and the targeting symbol 28. The image is a rectangle composed of pixels having a certain number of light intensity levels. The received image is stored in a digital format in the memory 30. The calibration module 22 is then invoked to identify the location of the targeting symbol 28. The calibration module 22 determines the center coordinates of a given graphical targeting symbol 28 found within the image.

Figure 3:
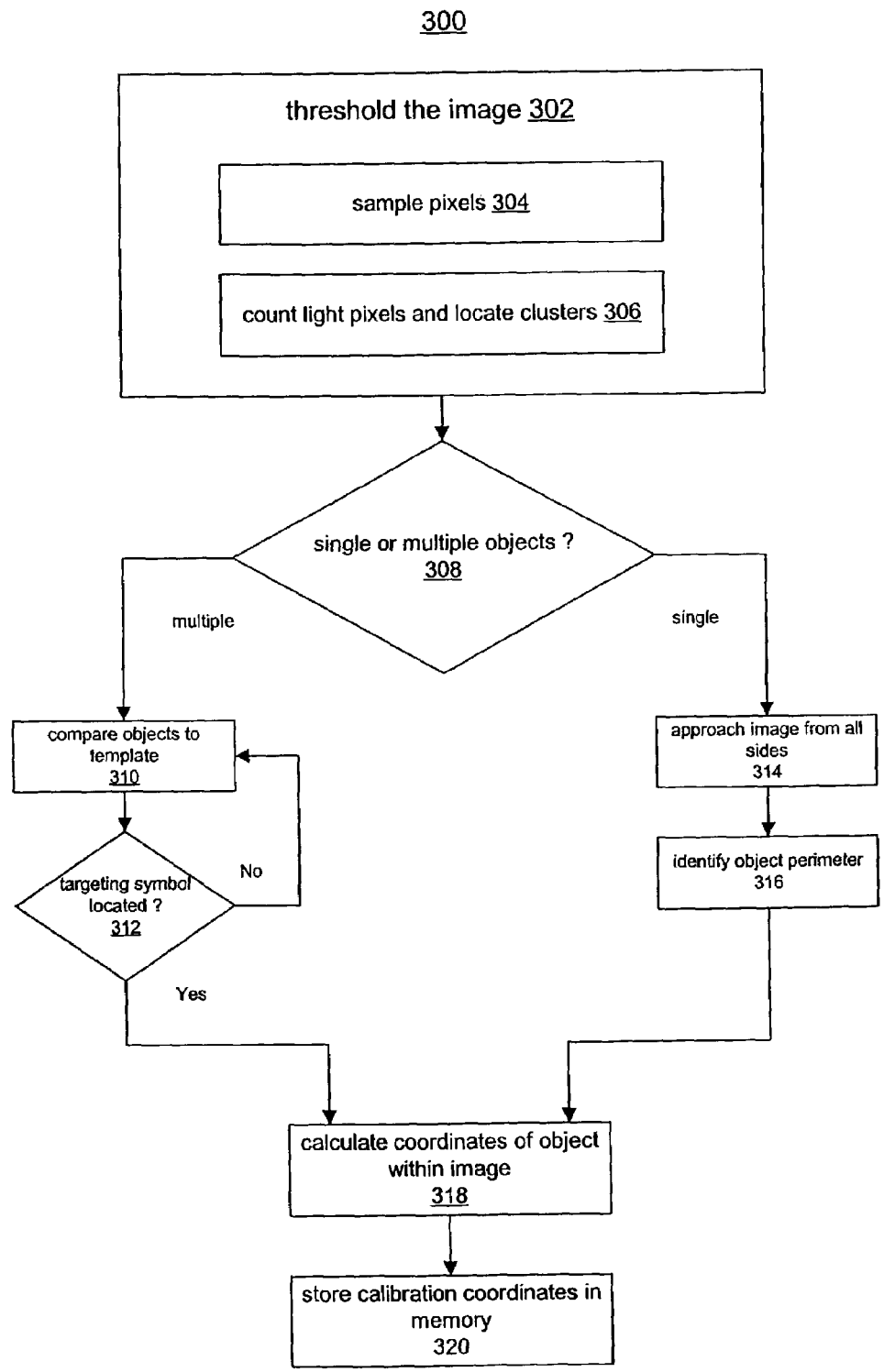
FIG. 3 is a flow diagram in locating a target center of one or more objects.

Referring to FIG. 3, a flow diagram 300 illustrates steps performed in locating the targeting symbol 28. The calibration module 22 commences by thresholding 302 the image, i.e., converting all pixels into one of two values, background or object pixel. To do a successful thresholding, a single value is identified which becomes a thresholding level. The thresholding level is used to classify all pixels of the image into two classes: background or object.

In classifying the pixels into object or background, a plurality of rows or columns of the image are sampled 304. Columns or rows are both generically referred to herein as "tracks." In sampling 304, a cluster of light pixels is searched. Light pixels are identified according to a set of predefined reference intensity levels. Some of the tracks, if there is any object at all, will present clusters of light pixels on a dark background.

Once light pixels are identified, the thresholding process 302 continues by counting 306 the light pixels in each cluster and locating their initial locations. If there is a luminous object in the image, several reference levels will detect clusters at similar locations, with slight variations in widths, because it will be analogous to a mountain being severed at different heights. Horizontal cross sections of mountains are wider as one approaches the base, and narrower as one approaches the peak. The cross sections are then nonexistent beyond the peak. The thresholding process 302 adopts the second reference level that produces non-null counts as the thresholding level for the image under analysis.

One of two searching methods may be implemented depending on the number of objects in the image. During the thresholding process 302, the number of objects is identified. The calibration module 22 determines 308 if there is a single object or multiple objects in the image. If there are multiple objects, the calibration module 22 compares 310 the objects with a template having the shape and size of the targeting symbol 28 under search. The module 22 determines 312 if the targeting symbol 28 has been located by determining if a reasonable match is made.

If the calibration module 22 determines 308 that there is a single object, then a multiple approach method is used. The module 22 approaches 314 the image from all four rectangular directions until a symbol border of the targeting symbol 28 is identified. The process continues until the symbol border is identified 316 along its entire perimeter.

In an alternative embodiment, the calibration module 22 may use the comparison method to locate a single object. Operation of the comparison method would be similar to that previously discussed. As such, the module 22 would compare a template of a similar shape and size to that of the object to provide a match.

In an embodiment where the projector 12 provides full-field illumination, the illumination may be disabled during calibration. This enables greater contrast between the targeting symbol 28 and the background.

Once the targeting symbol 28 is found, the calibration module 22 calculates 318 its coordinates within the image. The calibration module 22 then stores 320 the calibration coordinates in the memory 22 for later use in operation of the reader device 10. The calibration coordinates are subsequently used to compensate for actual coordinates of a bar code.

Figure 4:
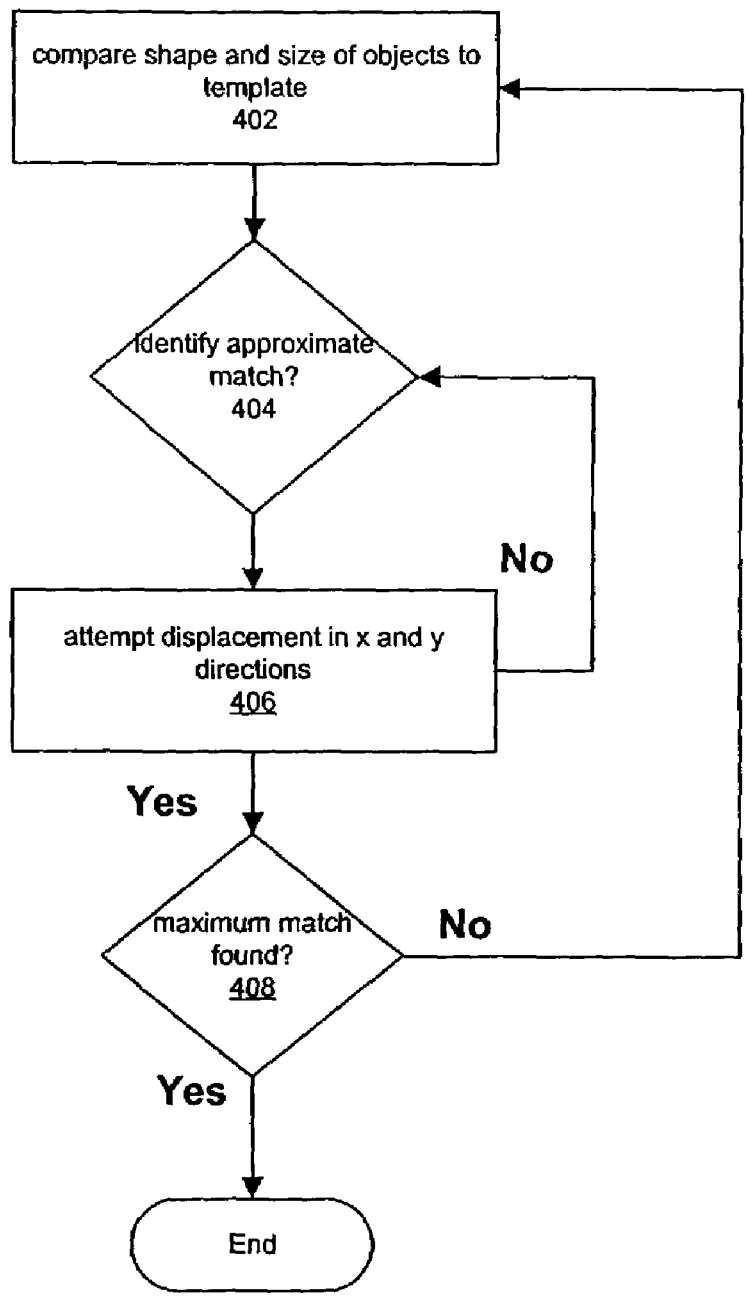
FIG. 4 is a flow diagram illustrating one embodiment of a comparison process of the present invention.

Referring to FIG. 4, a flow diagram 400 illustrating the comparison process of steps 310 and 312 in greater detail is shown. Every cluster of light pixels in the image has the potential of being the targeting symbol 28 being searched. The process 400 searches the targeting symbol 28 by comparing 402 a template with the shape and size of each object found at various positions within the image. A template may include a coordinate pair table generated from the vertical and horizontal axis lengths for each geometric shape required.

In the example of a bull's eye targeting symbol 28, the ring template is a list of pairs of coordinates of pixels inside two ellipses. In one configuration, the outer ring may be sized axes 138 by 114 pixels and the inner ring may be sized with axes 120 by 96 pixels. Both rings may have a thickness of 9 pixels.

A separate template is used for the center dot 32. In one configuration, the center dot 32 is a circular ring with an inner diameter of 26 pixels and an outer diameter of 44 pixels. By way of example, the table for the ring 30 surrounding the center dot 32 may be:

```
/* Coordinates for a ring surrounding the dot.
*/
const Point dotOutPix[numDotOutPix]=
{{-5,-21},{-3,-21},{-1,-21},{1,-21},{3,-21},{5,
    -21},{-11,-19},{-9,-19},{-7,-19},{-5,-19},{-3,
    -19},{-1,-19},{1,-19},{3,-19},{5,-19},{7,-19},{9,
    -19},{11,-19},{-13,-17},{-11,-17},{-9,-17},{-7,
    -17},{-5,-17},{-3,-17},{-1,-17},{1,-17},{3,-17},
    {5,-17},{7,-17},{9,-17},{11,-17},{13,-17},{-15,
    -15},{-13,-15},{-11,-15},{-9,-15},{-7,-15},{-5,
    -15},{-3,-15},
{-1,-15},{1,-15},{3,-15},{5,-15},{7,-15},{9,-15},
    {11,-15},{13,-15},{15,-15},{-17,-13},{-15,-13},
    {-13,-13},{-11,-13},{-9,-13},{-7,-13},{-5,-13},
{-3,-13},{-1,-13},{1,-13},{3,-13},{5,-13},{7,-13},
    {9,-13},{11,-13},{13,-13},{15,-13},{17,-13},{-19,
    -11},{-17,-11},{-15,-11},{-13,-11},{-11,-11},
{-9,-11},{-7,-11},{7,-11},{9,-11},{11,-11},{13,-11},
    {15,-11},{17,-11},{19,-11},{-19,-9},{-17,-9},
    {-15,-9},{-13,-9},{-11,-9},{11,-9},{13,-9},{15,
    -9},{17,-9},{19,-9},{-19,-7},{-17,-7},{-15,-7},
    {-13,-7},{-11,-7},{11,-7},{13,-7},{17,-7},{17,
    -7},{19,-7},{-21,-5},{-19,-5},{-17,-5},{-15,-5},
    {-13,-5},{13,-5},{15,-5},{17,-5},{19,-5},{21,-5},
    {-21,-3},{-19,-3},{-17,-3},{-15,-3},{-13,-3},
    {13,-3},{15,-3},{17,-3},{19,-3},{21,-3},{-21,-1},
    {-19,-1},{-17,-1},{-15,-1},{-13,-1},{13,-1},{15,
    -1},{17,-1},{19,-1},{-21,-1},{21,1},{-19,1},{-17,
    1},{-15,1},{-13,1},{13,1},{15,1},{17,1},{19,1},{21,
    1},{-21,3},{-19,3},{-17,3},{-15,3},{-13,3},{13,
    3},{15,3},{17,3},{19,3},{21,3},{-,5},{-19,5},{-17,
    5},{-15,5},{-13,5},{13,5},{15,5},{17,5},{19,5},{21,
    5},{-19,7},{-17,7},{-15,7},{-13,7},{-11,7},{11,7},
    {13,7},{15,7},{17,7},{19,7},{-19,9},{-17,9},{-15,
    9},{-13,9},{-11,9},{11,9},{13,9},{15,9},{17,9},{19,
    9},{-19,11},{-17,11},{-15,11},{-13,11},{-11,11},
    {-9,11},{-7,11},{7,11},{9,11},{11,11},{13,11},{15,
    11},{17,11},{19,11},{-17,13},{-15,13},{-13,13},
    {-11,13},{-9,13},
{-7,13},{-5,13},{-3,13},{-1,13},{1,13},{3,13},{5,13},
    {7,13},{9,13},{11,13},{13,13},{15,13},{17,13},
    {-15,15},{-13,15},{-11,15},
{-9,15},{-7,15},{-5,15},{-3,15},{-1,15},{1,15},{3,
    15},{5,15},{7,15},{9,15},{11,15},{13,15},{15,15},
    {-13,17},{-11,17},{-9,17},{-7,17},{-5,17},{-3,17},
    {-1,17},{1,17},{3,17},{5,17},{7,17},{9,17},{11,17},
    {13,17},{-11,19},{-9,19},{-7,19},{-5,19},{-3,19},
    {-1,19},{1,19},{3,19},{5,19},{7,19},{9,19},{11,19},
    {-5,21},{-3,21},{-1,21},{1,21},{3,21},{5,21}};
```

An approximate match is identified 404 when at least a certain number of the template pixels are found in a cluster tested. Once an approximate match is achieved, then small displacements are attempted 406 in both the x and y directions. This is done to increase the number of template pixels matching the object pixels in the image. All clusters that provide an approximate match are compared until a maximum match is found 408. The final outcome will be the coordinates of the searched targeting symbol 28, or the conclusion of its absence. This comparison method 400 may be used where the targeting symbol 28 contains a set of independent graphical objects bound together by spatial constraints.

With reference to FIG. 5, a flow diagram 500 of the comparison process as it is applied to bull's eye targeting symbol 28 is shown. The concentricity of the bull's eyes symbol facilitates aiming and makes it a popular configuration.

The objective of the process is to find the center coordinates of the targeting symbol 28. This is done, in part, by locating 502 the center of the ring 30. A ring template may list pairs of pixel coordinates inside two concentric closed geometric shapes such as an outer circle and an inner circle. Both the outer and inner circles have a sufficient thickness to cover the actual ring 30 in the image. At several assumed fixed positions of the center, the process counts 504 the number of pixels in the image that match the corresponding positions in a template (nMatch), as well as the number (nBG) of background pixels inside the inner ring. The coordinates of the background pixels inside the inner ring are found in another template.

The product of both counts is used to clearly distinguish between a matching and a non-matching center position. When the matched pixels are few or there are many object pixels inside the opening in the template, the product of nMatch*nBG is very small. The product of nMatch*nBG is large when matching pixels in the ellipse are numerous and the number of background pixels inside the ellipse is large. Thus, the amount of matching is effectively measured by the product of counts.

In order to find 506 a coarse approximation of the center, the center coordinates are incremented and these pixel counts are repeated until a sufficient minimum product of counts is attained. The cluster area may be traversed vertically at different abscissas at regular intervals to find intersections of the possible ring. If the traversal reveals intersections with clusters of object pixels, then an attempt is made to find the closed figure bottom and top. The verification is repeated for intermediate abscissas to avoid missing a candidate center due to possible gaps in the ring image.

The product nMatch*nBG is then found for centers at fixed increments along the horizontal axis between the above determined bottom and top of the closed geometric shape. When the product is greater than a given minimum, then the process assumes the center as a coarse approximation to the ring center. At this point, the corresponding assumed center is considered a coarse approximation to the ring center position.

The center coordinates are refined 508 by changing the center coordinates slightly in both directions, until the product nMatch*nBG is maximized. Starting from the coarse determination of the center, the process 500 increments or decrements in each direction as long as there is an improvement of the counts of pixels matching the elliptical template. The process 500 searches along the abscissas first, then along the ordinates, then along the abscissas again, because sometimes evolving in the y direction may cause a relative worsening of the center position.

The process 500 continues with locating 510 the center of the center dot 32. Within the height of the elliptical ring, and within one half horizontal axis of either side of the ring, the algorithm searches for the center dot 32. For this purpose, center points are assumed at fixed increments of x and y coordinates. The process counts 512 the number of matching pixels nMatch inside the center dot 32 the number of background pixels outside it nBG.

The process 500 locates 514 the coarse approximation of the center dot 32 when the product of nMatch*nBG is higher than a given minimum. By doing coarse increments within the work area of the image, the product of nMatch*nBG product is calculated for each assumed position. The object pixel clusters corresponding to the ring 30 are already masked by the ring template. When the product is larger than a certain minimum, the assumed center is considered a good coarse approximation.

The process 500 refines 516 the location of the center of the center dot 32 by repeating the product of counts for smaller increments until a maximum (nMatch*nBG) is reached. Assuming that the coarse center is somewhere inside the dot cluster, the possible cluster is traversed vertically to detect where a transition occurs from inside the cluster to the background: top and bottom of the detected center dot 32.

Assuming that the transition ordinates are equidistant from the center, the center ordinate is found to be their average value:

$$y=(topDot+botDot)/2.$$

The center dot 32 is then traversed from left to right along the ordinate axis 'y' to obtain the left and right transition positions 'leftDot' and 'rightDot'. The center abscissa is given by:

$$x=(leftDot+rightDot)/2.$$

The process 500 frees a mechanical assembler from the need to do a perfect alignment of the camera axis with the optical axis of the light sources that produce the targeting symbol 28 on the plane surface 26 for scanning. Even a strongly misaligned assembly can be calibrated by the calibration module 22. This is done by replacing the default target point coordinates in the firmware by the calibration coordinates derived from the image.

In the case of a bull's eye symbol, constituted by two separate objects, each object can be projected separately during the calibration, captured and located by the algorithm independently. The advantage of this alternative approach is that, depending on the distance of the camera 14 from the planar surface 26, the center dot 32 would be at different locations in relation to the ring 30. This includes the juxtaposition of the two objects, in which case the simultaneous projection of both objects would hide the actual situation from the algorithm.

Figure 6:
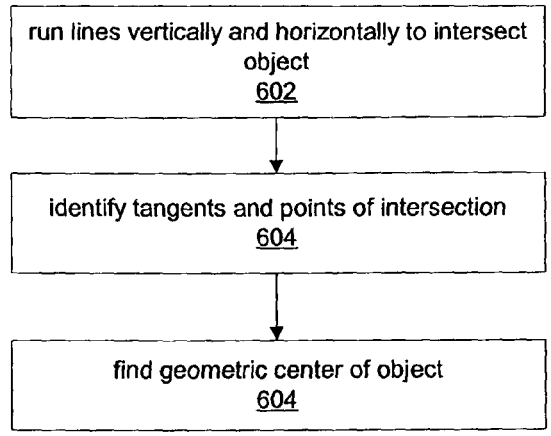
FIG. 6 is a flow diagram illustrating one embodiment of a multiple approach process of the present invention.

Referring to FIG. 6, a flow diagram representing the multiple approach process 600 that is used for a single object is shown. The process 600 runs 602 straight lines at intervals from the left, right, top and bottom of the frame until the perimeter of the object is defined. The lines may run vertically from one side of the image, such as the left side, using wide increments, until a cluster is found. The initial information on a cluster location can be retrieved from the thresholding process.

The process 600 includes identifying 604 points of intersection and tangents with the object. Vertical lines define multiple columns as they traverse the image. When a column finds a slice of the object, the column is backed out one at a time, until no cross section is found. The last column with intersection is the left tangent to the object. The same method is repeated approaching from the right. The same method is used from the top and the bottom by defining rows. Once again, columns and rows may be collectively referred to as tracks. One of skill in the art will appreciate that the process may commence from any one of the four sides. To save computing cycles, the previously found information may be used.

Once the positions where the lines intersect the object are found, the existing symmetry relations are used to find 604 the geometrical center of the object. In the case of an ellipse or circle, which have both vertical and horizontal symmetry, an average is calculated between the coordinates in each axis. Once the four tangent positions are found, if the object is fully symmetrical, as in the case of a circle or ellipse, the center abscissa is found to be the average between the left and right intersections. The center ordinate is found to be the average between the top and bottom intersections. If the object has no symmetry, known relations of the object shape may be used to estimate the geometrical center, or center of gravity.

Figure 7:
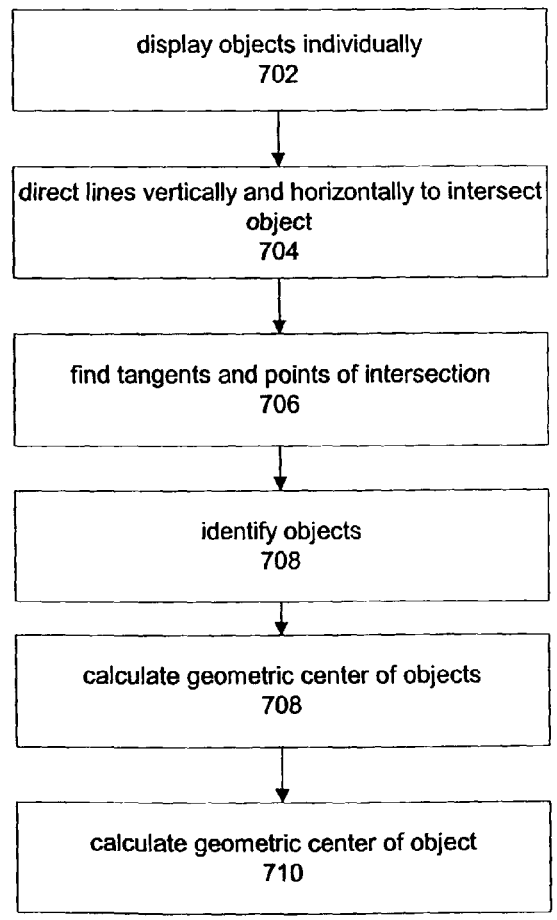
FIG. 7 is a flow diagram illustrating one embodiment of the multiple approach process for multiple objects.

Referring to FIG. 7, a flow diagram of a process 700 is shown that may be used to find the centers of different objects that are present in the image at different times. For example, the bull's eye symbol includes a ring and a center dot. The ring and the center dot are displayed 702 one at a time. Lines are directed 704 from the four frame margins to find 706 four tangential points regardless of whether it is the dot, ring, or ellipse.

The object is identified 708 by noting the distances between intersections that define the object's diameter. The geometrical center of the object is then calculated 710 as before. After both objects have been displayed, the center of gravity of both objects are calculated 712 as before. The center of gravity becomes the corrected target center for the particular optical reader device 10.

Figure 8:
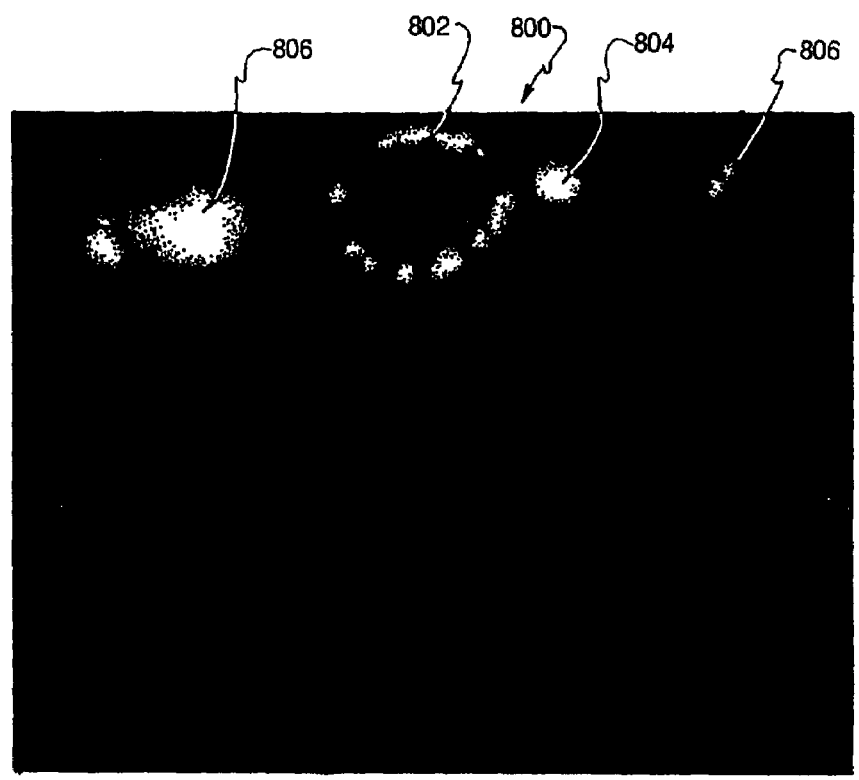
FIG. 8 illustrates a captured image having a targeting symbol and noise clusters.

An example of implementation of the present invention is now discussed. Referring to FIG. 8, a bull's eye object 800 having a ring 802 and a center dot 804 is shown. The center dot 804 is located to the right of the ring 802 to indicate poor alignment. The image of the elliptical ring 802 has poor illumination. The ring 802 should be continuous but is actually segmented into portions with varying gray levels. The object 800 is also adjacent significant noise clusters 806 which could be due to reflected light. The object 800 is also near the edge of the image instead of appearing at the geometrical center of the frame, due to assembly misalignment.

The image may contain noise from any number of sources. More specifically, the configuration of the optical reader device 10 may result in a noise cluster of light pixels. For example, the device 10 may include a window through which light from the projector 12 passes. As the light passes through the window, a portion of the light may reflect back onto the camera 14 at known locations such as the upper left and right corners. Noise clusters in known locations are identified by the calibration module 22 as noise in either the comparison or multiple approach process. Noise clusters may also be rejected based on a comparison to a template as discussed in reference to FIG. 9.

Figure 9:
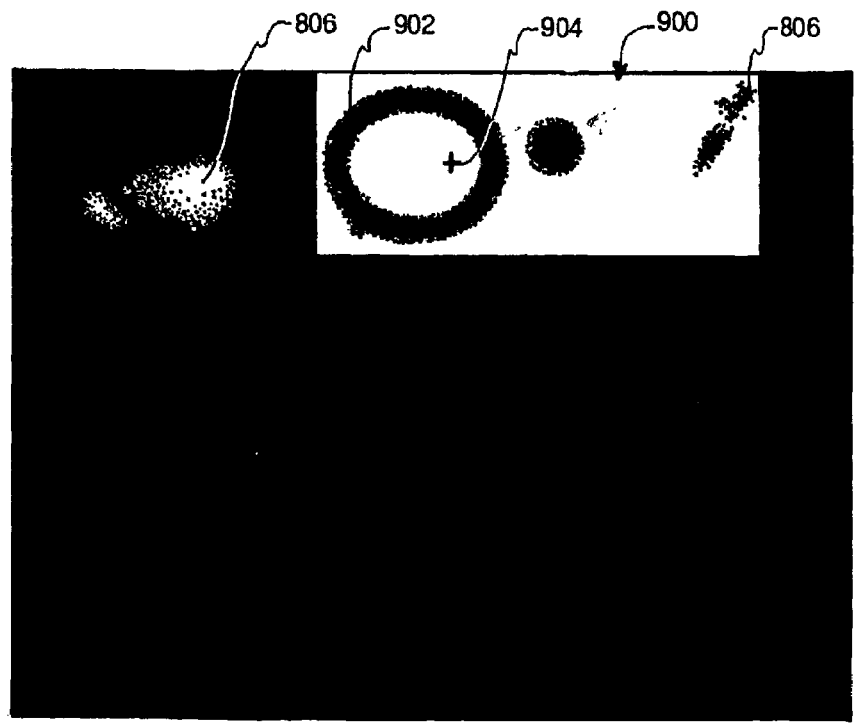
FIG. 9 illustrates the image of FIG. 8 with a template overlaid.

Referring to FIG. 9, an image is shown wherein the object 800 undergoes the comparison method of the present invention. The image shown in, FIG. 9 has been thresholded to identify pixels as either objects or background. A template 900 that includes an elliptical ring template 902 is superimposed on the object 800. The comparison method rejects the noise clusters 806 that do not match the shape of the template 900. A new target center is marked by a small cross 904 on the right side of the ring template 904. The cross 904 is at the middle of a line connecting the elliptical ring center and the dot center.

This example demonstrates how a target center may be located when it is highly deviated from the intended location. The present invention is also able to locate a target center when the captured image includes gaps in an object and the targeting symbol is surrounded by considerable noise.

Figure 10:
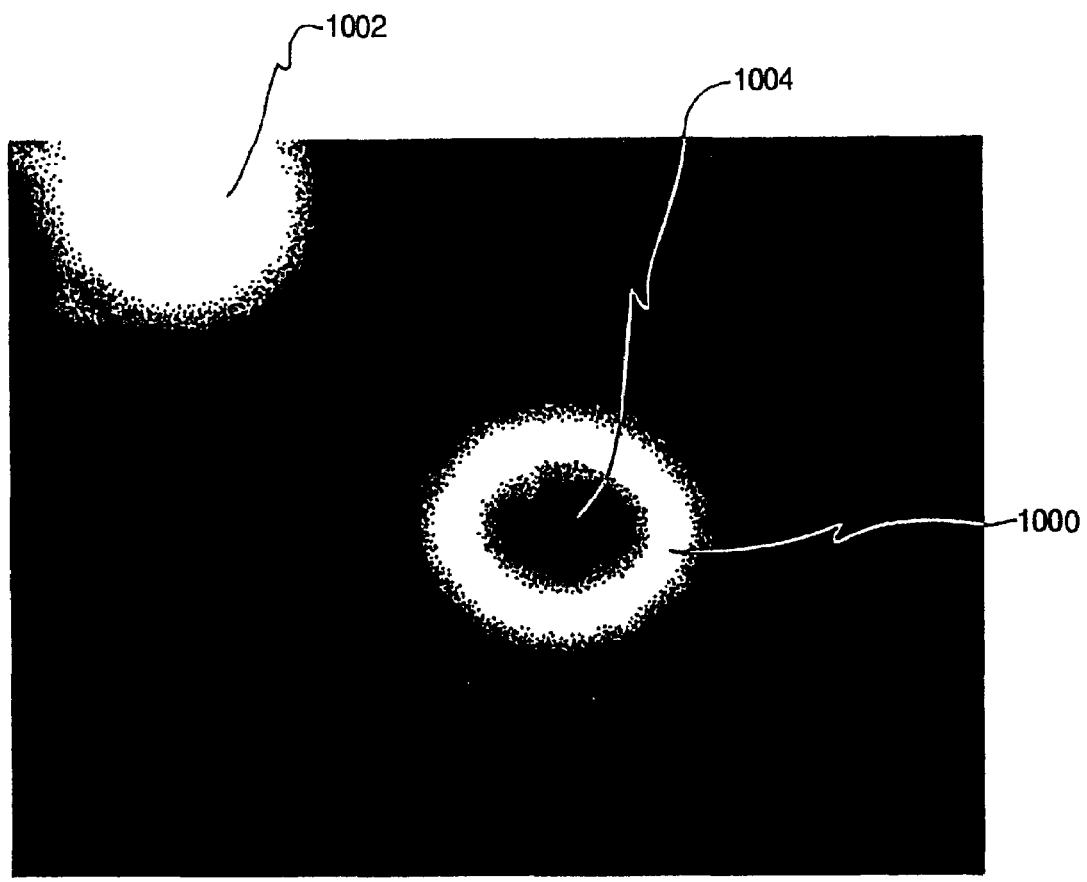
FIG. 10 illustrates a captured image having a targeting symbol and a noise cluster.

Referring to FIG. 10, an image is shown wherein two objects are separately detected: a ring 1000, and a noise cluster 1002. The ring 1000 is identified and the target center is detected and indicated 1004. The location of the targeting symbol 28 is expected to be near the center of the image.

In one embodiment, a rectangle or other geometrical boundary may be defined that includes the middle of the image and excludes the edges. Only the portion of the image that is within the rectangle is processed. In general, the size and position of noise clusters as compared to the expected size and position of the targeting symbol 28 is considered by the calibration module 22. For example, noise clusters that are too large or too small may be excluded. Furthermore, with several clusters, the cluster closest to the expected size and position of the targeting symbol 28 may be selected and the other clusters are rejected.

Figure 11:
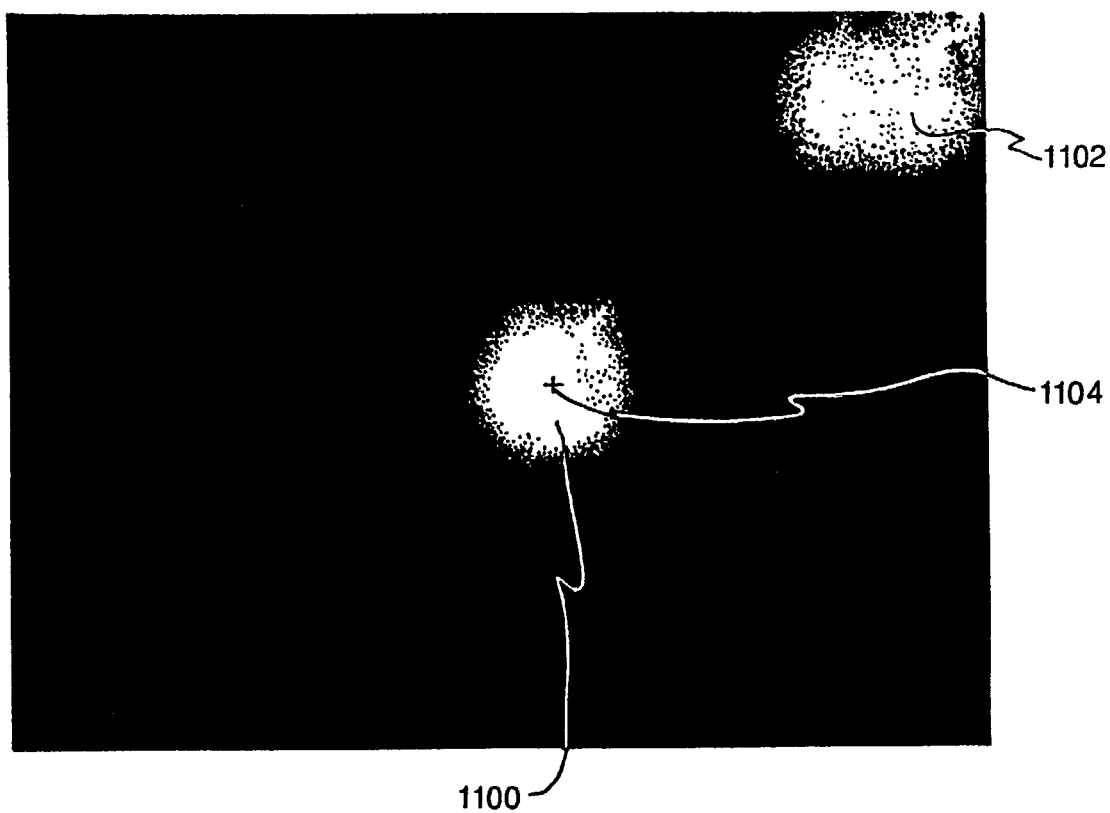
FIG. 11 illustrates a captured image having a targeting symbol and a noise cluster.

Referring to FIG. 11, an image shows a dot 1100 and a noise cluster 1102. The large and irregular cluster is not considered in identifying the target center. The target center is marked with a cross 1104. These examples are illustrative of how the present invention can filter out noise clusters and accurately identify a target center of a targeting symbol.

The present invention provides a unique method for calibrating an optical reader device which lowers manufacturing costs and may increase manufacturing speed and efficiency. By eliminating mechanical adjustments, assembly can be done with wider tolerances. Furthermore, mechanical and electrical components can be chosen with less tight specifications. In the event that the optical reader device experiences a mechanical change due to accidents, dropping the device, for example, it can be recalibrated in the field.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for locating the coordinates of a targeting symbol within an image for calibrating an optical reader device, the method comprising:
   the optical reader device projecting the targeting symbol onto a surface;
   the optical reader device capturing the image;
   locating the targeting symbol in the image; and
   upon identifying the targeting symbol, calculating coordinates of the targeting symbol in the image.

2. The method of claim 1, wherein locating the targeting symbol comprises:
   thresholding the image to identify clusters; and
   comparing a cluster to a template to identify the targeting symbol.

3. The method of claim 1, further comprising storing the coordinates in a memory.

4. The method of claim 3, further comprising using the coordinates to select a machine-readable graphical code nearest the targeting symbol from a plurality of machine-readable graphical codes.

5. The method of claim 2, wherein thresholding the image comprises sampling pixels to identify the pixels as light or background.

6. The method of claim 5, wherein thresholding the image further comprises comparing the intensity of each pixel to a threshold value to identify the pixel as light or background.

7. The method of claim 5, wherein thresholding the image further comprises:
   counting identified light pixels that form a cluster; and
   locating the cluster in the image.

8. The method of claim 2, wherein comparing clusters to a template further comprises comparing the shape and size of each cluster to the template.

9. The method of claim 2, wherein comparing clusters to a template further comprises identifying clusters that are approximate matches.

10. The method of claim 9, wherein comparing clusters to a template further comprises attempting displacements for approximate clusters in the x and y axes to thereby identify a cluster that is a maximum match.

11. The method of claim 2, wherein calculating coordinates of the targeting symbol includes calculating the center of the targeting symbol.

12. The method of claim 11, wherein the targeting symbol includes a bull's eye having a ring and a center dot, and wherein calculating the center comprises:
   locating the center of the ring;
   locating the center of the center dot; and
   calculating a target point from the location of the center of the ring and the location of the center of the center dot.

13. The method of claim 11, wherein locating the center of the ring comprises:
   counting the number of pixels matching a ring portion of the template;
   counting the number of background pixels within the ring and outside the center dot; and
   locating a best match for the template.

14. The method of claim 13, wherein locating a best match for the template includes positioning the template to find a maximal product of the count of matching ring pixels and the count of background pixels within the ring and outside the center dot.

15. The method of claim 13 further comprising:
   locating a coarse approximation of the center of the ring; and
   refining the location of the center of the ring.

16. The method of claim 13, wherein locating the center of the center dot comprises:
   counting the number of pixels matching a center dot portion of the template;
   counting the number of background pixels outside the center dot and within the ring; and
   locating a best match for the template.

17. The method of claim 16 wherein locating a best match for the template includes positioning the template to find a maximal product of the count of matching center dot pixels and the count of background pixels within the ring and outside the center dot.

18. The method of claim 16 further comprising:
   locating a coarse approximation of the center of the center dot; and
   refining the location of the center of the center dot.

19. The method of claim 1 further comprising:
   illuminating the surface; and
   ceasing illumination of the surface while projecting the targeting symbol.

20. An optical reader apparatus for locating the coordinates of a targeting symbol within an image for calibration, the apparatus comprising:
   a projector for projecting the targeting symbol onto a surface;
   a camera for capturing the image on the surface, the image including the targeting symbol;
   a processor in electrical communication with the projector and the camera;

a memory in electrical communication with the processor, the memory including a calibration module programmed to implement a method comprising:
receiving the captured image;
locating the targeting symbol in the image; and
upon identifying the targeting symbol, calculating coordinates of the targeting symbol in the image.

21. The apparatus of claim 20, wherein locating the targeting symbol comprises:
thresholding the image to identify clusters; and
comparing clusters to a template to identify the targeting symbol.

22. The apparatus of claim 20, wherein the method further comprises storing the coordinates in a memory.

23. The apparatus of claim 22, wherein the method further comprises using the coordinates to select a machine-readable graphical code nearest the targeting symbol from a plurality of machine-readable graphical codes.

24. The apparatus of claim 21, wherein thresholding the image comprises sampling pixels to identify the pixels as light or background.

25. The apparatus of claim 24, wherein thresholding the image further comprises comparing the intensity of each pixel to a threshold value to identify the pixel as light or background.

26. The apparatus of claim 24, wherein thresholding the image further comprises:
counting identified light pixels that form a cluster; and
locating the cluster in the image.

27. The apparatus of claim 21, wherein comparing clusters to a template further comprises comparing the shape and size of each cluster to the template.

28. The apparatus of claim 21, wherein comparing clusters to a template further comprises identifying clusters that are approximate matches.

29. The apparatus of claim 28, wherein comparing clusters to a template further comprises attempting displacements for approximate clusters in the x and y axes to thereby identify a cluster that is a maximum match.

30. The apparatus of claim 21, wherein calculating coordinates of the targeting symbol includes calculating the center of the targeting symbol.

31. The apparatus of claim 21, wherein the targeting symbol includes a bull's eye having a ring and a center dot, and wherein calculating the center comprises:
locating the center of the ring;
locating the center of the center dot; and
calculating a target point from the location of the center of the ring and the location of the center of the center dot.

32. The apparatus of claim 31, wherein locating the center of the ring comprises:
counting the number of pixels matching a ring portion of the template;
counting the number of background pixels within the ring and outside the center dot; and
locating a best match for the template.

33. The apparatus of claim 32, wherein locating a best match for the template includes positioning the template to find a maximal product of the count of matching ring pixels and the count of background pixels within the ring and outside the center dot.

34. The apparatus of claim 32 further comprising:
locating a coarse approximation of the center of the ring; and
refining the location of the center of the ring.

35. The apparatus of claim 32, wherein locating the center of the center dot comprises:
counting the number of pixels matching a center dot portion of the template;
counting the number of background pixels outside the center dot and within the ring; and
locating a best match for the template.

36. The apparatus of claim 35 wherein locating a best match for the template includes positioning the template to find a maximal product of the count of matching center dot pixels and the count of background pixels within the ring and outside the center dot.

37. The apparatus of claim 35 further comprising:
locating a coarse approximation of the center of the center dot; and refining the location of the center of the center dot.

38. The apparatus of claim 20 wherein a light source is configured to illuminate the surface and the light source is in electrical communication with a switch to enable user operation of the illumination.

39. A method for locating the coordinates of a targeting symbol within an image for calibrating an optical reader device, the method comprising:
the optical reader device projecting the targeting symbol onto a surface;
the optical reader device capturing the image;
thresholding the image to identify a cluster;
directing lines vertically and horizontally to the cluster to identify the targeting symbol; and
upon identifying the targeting symbol, calculating coordinates of the targeting symbol in the image.

40. The method of claim 39, further comprising storing the coordinates in a memory.

41. The method of claim 40, further comprising using the coordinates to select a machine-readable graphical code nearest the targeting symbol from a plurality of machine-readable graphical codes.

42. The method of claim 39, wherein thresholding the image comprises sampling pixels to identify the pixels as light or background.

43. The method of claim 42, wherein thresholding the image further comprises comparing the intensity of each pixel to a threshold value to identify the pixel as light or background.

44. The method of claim 42, wherein thresholding the image further comprises:
counting identified light pixels that form a cluster; and
locating the cluster in the image.

45. The method of claim 39, wherein directing lines vertically and horizontally includes defining tracks to intersect the cluster and wherein the method further comprises:
identifying tracks that intersect a cross section of the cluster; and
identifying tracks that do not intersect a cross section of the cluster to thereby locate tangents to the cluster.

46. The method of claim 39, wherein calculating coordinates of the targeting symbol comprises locating the geometric center of the targeting symbol.

47. The method of claim 46, wherein locating the geometric center of the targeting symbol comprises applying symmetric relationships of the targeting symbol.

48. The method of claim 46, wherein locating the geometric center of the targeting symbol comprises applying known geometric relationships of the targeting symbol.

49. The method of claim 39 further comprising:
  illuminating the surface; and
  ceasing illumination of the surface while projecting the targeting symbol.

50. The method of claim 39 further comprising rejecting a noise cluster based on the noise cluster being in a region of the image distant from an expected location of the targeting symbol.

51. The method of claim 39 further comprising rejecting a noise cluster based on the noise cluster being in an expected region of the image.

52. An optical reader apparatus for locating the coordinates of a targeting symbol within an image for calibration, the apparatus comprising:
  a projector for projecting the targeting symbol onto a surface;
  a camera for capturing the image on the surface, the image including the targeting symbol;
  a processor in electrical communication with the projector and the camera;
  a memory in electrical communication with the processor, the memory including a calibration module programmed to implement a method comprising:
  thresholding the image to identify a cluster;
  directing lines vertically and horizontally to the cluster to identify the targeting symbol; and
  upon identifying the targeting symbol, calculating coordinates of the targeting symbol in the image.

53. The apparatus of claim 52, wherein the method further comprises storing the coordinates in a memory.

54. The apparatus of claim 52, wherein thresholding the image comprises sampling pixels to identify the pixels as light or background.

55. The apparatus of claim 54, wherein thresholding the image further comprises comparing the intensity of each pixel to a threshold value to identify the pixel as light or background.

56. The apparatus of claim 54, wherein thresholding the image further comprises:
  counting identified light pixels that form a cluster; and
  locating the cluster in the image.

57. The apparatus of claim 52, wherein directing lines vertically and horizontally includes defining tracks to intersect the cluster and wherein the method further comprises:
  identifying tracks that intersect a cross section of the cluster; and
  identifying tracks that do not intersect a cross section of the cluster to thereby locate tangents to the cluster.

58. The apparatus of claim 52, wherein calculating coordinates of the targeting symbol comprises locating the geometric center of the targeting symbol.

59. The apparatus of claim 58, wherein locating the geometric center of the targeting symbol comprises applying symmetric relationships of the targeting symbol.

60. The apparatus of claim 58, wherein locating the geometric center of the targeting symbol comprises applying known geometric relationships of the targeting symbol.

61. The apparatus of claim 52, wherein the method further comprises rejecting a noise cluster based on the noise cluster being in a region of the image distant from an expected location of the targeting symbol.

62. The apparatus of claim 52, wherein the method further comprises rejecting a noise cluster based on the noise cluster being in an expected region of the image.

* * * * *